(No Model.)
C. LONGSTRETH.
METALLIC ROD PACKING.
No. 503,723. Patented Aug. 22, 1893.
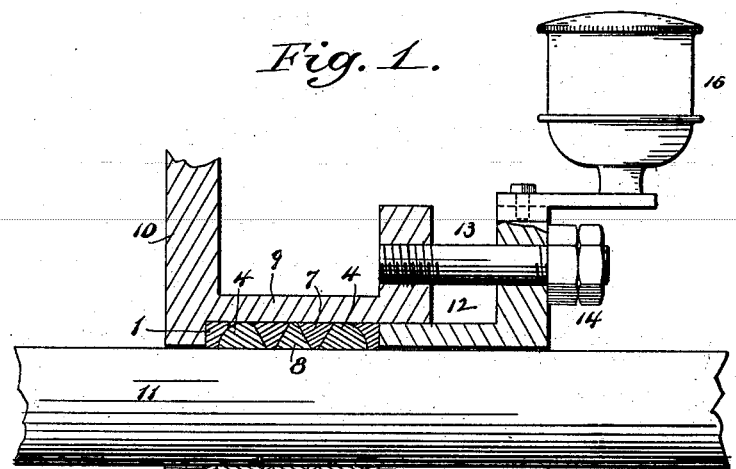
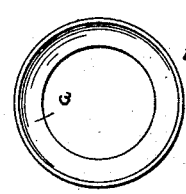
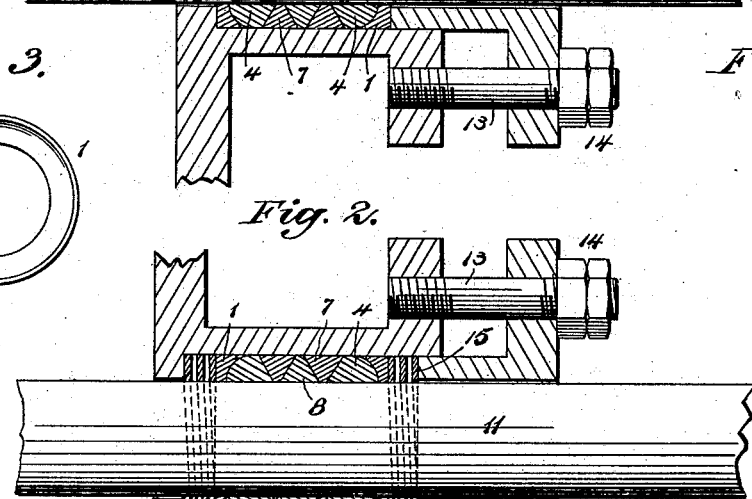
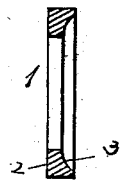
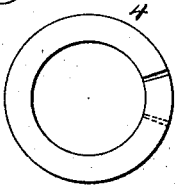
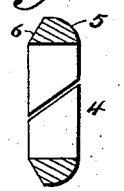
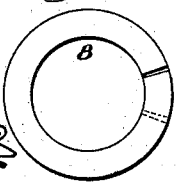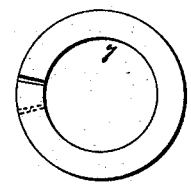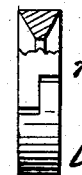
WITNESSES:
John M. Reamer
Henry L. Goodwin
INVENTOR
Charles Longstreth
BY
Benjamin
ATTORNEY

UNITED STATES PATENT OFFICE.

CHARLES LONGSTRETH, OF PHILADELPHIA, PENNSYLVANIA, ASSIGNOR TO THE UNITED STATES METALLIC PACKING COMPANY, OF SAME PLACE.

METALLIC ROD-PACKING.

SPECIFICATION forming part of Letters Patent No. 503,723, dated August 22, 1893.

Application filed March 11, 1893. Serial No. 465,526. (No model.)

*To all whom it may concern:*

Be it known that I, CHARLES LONGSTRETH, a citizen of the United States, residing in the city and county of Philadelphia, in the State of Pennsylvania, have invented new and useful Improvements in Metallic Rod-Packings, of which the following is a specification.

This invention relates to packings of that class used for making steam, water or vapor-tight joints around piston rods or valve stems, reciprocating or otherwise working in stuffing boxes of engines, pumps or other machinery.

The invention has for its object to improve packings of this character in a manner assuring tight joints both around the rod or stem, which is allowed lateral play, and at the wall of the stuffing-box, irrespective of the planes of the end walls of the cylinder and gland between which the packing is compressed.

The invention will first be described and then will be particularly defined in claims hereinafter set forth.

Reference is to be had to the accompanying drawings, forming a part of this specification, in which like numerals indicate similar parts in all the views.

Figure 1 is a longitudinal sectional elevation illustrating my invention; an oil cup for lubricating the piston rod being also shown. Fig. 2 is a similar sectional view showing a modification, and Figs. 3 to 10, inclusive, are detail face and edge views of the rings, hereinafter specially referred to.

In my improved packing, I employ two outer or end rings 1, 1, of suitable metal, shown detached in Figs. 3 and 4 of the drawings, and each having an outside plane face 2 and an inside concave face 3. Next the rings 1, 1, are placed rings 4, 4, each having a convex outer face 5 adapted to the face 3 of the adjacent ring 1, and also having an inwardly flaring or inclined inner face 6, and next the rings 4, 4 are located two rings 7, 7, having substantially triangular cross sectional form and disposed with their apices at the inside, and between said rings 7, 7, is placed a third triangular ring 8 having its apex at the outside, all as clearly shown in Fig. 1 of the drawings. After thus assembling the packing rings within the stuffing box 9 on the cylinder, valve chest or other part 10, and around the piston rod or valve stem 11, working therein, the gland 12 is applied within the box outside the packing and is made adjustable to compress the packing, to maintain a tight joint around the moving rod or stem, by means of bolts 13 having lock nuts 14. A spring 15, or other substantially similar elastic body, cushioning the parts against undue shocks, may be interposed at one or both ends of the assembled packing rings, as shown in Fig. 2 of the drawings.

The openings in the cylinder or chest and in the gland through which the rod 11 moves are larger than the rod to give it necessary freedom for lateral play to accommodate non-alignment of parts of the engine, pump or other machine to or in which the rod is applied. An oil cup 16, shown fastened to the gland 13 in Fig. 1 of the drawings, serves to lubricate the moving rod 11 and the rings packing the rod within the stuffing-box.

The end rings 1, 1 of the packing, which I term compressing rings, are not split or divided, but the other rings 4, 7 and 8 are split or divided and it may be angularly or by a halved joint or in any other suitable manner allowing them to be expanded against opposing faces of the stuffing box and piston rod or valve stem, to effect perfectly tight joints thereat by the pressure of the gland.

It will be noticed that by using packing rings 4, 7 and 8 and the plano-concave end compressing rings 1, 1, and even when the end springs or elastic mediums 15, 15 are not interposed, it is immaterial whether the opposite end walls of the cylinder 10 and gland 12, which act on the rings 1, 1, are strictly parallel and at exact right angles with the side walls of the stuffing-box, because should these face irregularities exist, the inner convex faces of the rings 1, 1, will accommodate themselves to the corresponding convex outer faces of the rings 4, 4, and the latter by pressure on the opposing rings 7, 7 will force them outward more closely to the side wall of the stuffing-box, while said rings 7 force the three rings 4, 4, 8 more closely to the piston rod or stem 11. The effect of the packing in securing permanently tight joints at the wall of the stuffing-box and next the piston rod will be substantially the same when the cushioning springs or elastic mediums 15 are used.

My packing requires at least three rings 7, 7, 8 between the rings 4, 4, which are pressed by the plano-concave rings 1, 1, but should the stuffing-box be relatively longer than is shown in the drawings, two or more duplicate rings 7, 8 may be used. Insofar as concerns some features of my invention, it is immaterial whether the end rings 1, 1, have plane outer faces, which however are preferred in practice.

I claim—

1. A metallic rod packing, comprising end compressing rings having inner concave faces, rings having outer convex faces fitting the inner faces of the end rings and having inclined or inwardly diverging inner faces, and three or more rings having substantially triangular cross section and disposed with apices and bases reversed between the last named rings, substantially as described.

2. A metallic rod packing, comprising unsplit end compressing rings having inner concave faces, split rings having outer convex faces fitting the inner faces of the end rings and having inclined or inwardly diverging inner faces, and three or more split rings having substantially triangular cross section and disposed with apices and bases reversed between the last named rings, substantially as described.

3. A metallic rod packing, comprising end compressing rings having inner concave faces, rings having outer convex faces fitting the inner faces of the end rings and having inclined or inwardly diverging inner faces, three or more rings having substantially triangular cross section and disposed with apices and bases reversed between the last named rings, and springs or elastic cushioning devices outside the end rings, substantially as described.

In testimony whereof I affix my signature in the presence of two witnesses.

CHARLES LONGSTRETH.

Witnesses:
GEO. H. BENJAMIN,
EDW. B. HAWKINS.